US011165614B1

(12) United States Patent
Srinivasa et al.

(10) Patent No.: US 11,165,614 B1
(45) Date of Patent: Nov. 2, 2021

(54) WIRELESS COMMUNICATION DEVICE

(71) Applicant: NXP USA, Inc., Austin, TX (US)

(72) Inventors: Sudhir Srinivasa, Los Gatos, CA (US); Yui Lin, Palo Alto, CA (US); Hongyuan Zhang, Fremont, CA (US); Mao Yu, San Jose, CA (US); Timothy J. Donovan, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/098,709

(22) Filed: Nov. 16, 2020

(51) Int. Cl.
*H04L 27/26* (2006.01)
*H04W 84/12* (2009.01)

(52) U.S. Cl.
CPC ......... *H04L 27/2601* (2013.01); *H04W 84/12* (2013.01)

(58) Field of Classification Search
CPC ... H04L 5/023; H04L 27/2601; H04L 5/0007; H04L 27/2602; H04L 27/2626; H04L 1/0033; H04L 1/0041; H04L 1/0009; H04L 5/0064; H04W 72/082; H04W 72/1231; H04W 92/18; H04B 7/0452
See application file for complete search history.

(56) References Cited

U.S. PATENT DOCUMENTS

| | | | |
|---|---|---|---|
| 8,724,720 B2 | 5/2014 | Srinivasa et al. | |
| 9,118,530 B2 | 8/2015 | Srinivasa et al. | |
| 9,413,576 B2 | 8/2016 | Srinivasa et al. | |
| 9,655,002 B2 | 5/2017 | Zhang et al. | |
| 9,668,204 B2 | 5/2017 | Rabii et al. | |
| 9,763,247 B2 | 9/2017 | Sidhu et al. | |
| 10,003,432 B2 | 6/2018 | Srinivasa et al. | |
| 2006/0159003 A1* | 7/2006 | Nanda | H04W 16/10 370/203 |
| 2009/0016231 A1* | 1/2009 | Li | H04L 5/0007 370/252 |
| 2009/0016295 A1* | 1/2009 | Li | H04L 5/0044 370/330 |
| 2010/0309848 A1* | 12/2010 | Erceg | H04L 5/0023 370/328 |
| 2013/0128807 A1* | 5/2013 | Vermani | H04L 27/2602 370/328 |
| 2013/0301556 A1* | 11/2013 | Porat | H04L 1/0041 370/329 |
| 2019/0288721 A1 | 9/2019 | Di Giandomenico et al. | |

* cited by examiner

*Primary Examiner* — Khanh C Tran

(57) ABSTRACT

One example discloses an OFDM wireless communications device, including: a memory configured to support processing of OFDM tones; a controller, coupled to the memory, and configured to set the wireless communication device to a first mode and a second mode; wherein the first mode is configured to transmit or receive a first wireless communication signal having a first set of OFDM tones contained within an OFDM channel bandwidth; wherein the second mode is configured to transmit or receive a second wireless communication signal having a second set of OFDM tones contained within the OFDM channel bandwidth; and wherein the memory used for processing the first set of OFDM tones is same as the memory used for processing the second set of OFDM tones.

29 Claims, 7 Drawing Sheets

WIRELESS COMMUNICATION DEVICE

INCORPORATION BY REFERENCE UNDER 37 CFR§ 1.57

The specification herein incorporates by reference U.S. Ser. No. 10/003,432 granted on 2018, Jun. 19, and U.S. Pat. No. 9,655,002B2 granted on 2017, May 16.

BACKGROUND

The present specification relates to systems, methods, apparatuses, devices, articles of manufacture and instructions for wireless communications and, more particularly, to wireless local area networks that utilize orthogonal frequency division multiplexing (OFDM).

Wireless local area network (WLAN) standards promulgated by the Institute for Electrical and Electronics Engineers (IEEE) include: 802.11a, 802.11b, 802.11g, 802.11n, 802.11ac and 802.11ax.

SUMMARY

According to an example embodiment, an OFDM wireless communications device, comprising: a memory configured to support processing of OFDM tones; a controller, coupled to the memory, and configured to set the wireless communication device to a first mode and a second mode; wherein the first mode is configured to transmit or receive a first wireless communication signal having a first set of OFDM tones contained within an OFDM channel bandwidth; wherein the second mode is configured to transmit or receive a second wireless communication signal having a second set of OFDM tones contained within the OFDM channel bandwidth; and wherein the memory used for processing the first set of OFDM tones is same as the memory used for processing the second set of OFDM tones.

In another example embodiment, the OFDM channel bandwidth is same in both the first mode and the second mode.

In another example embodiment, further comprising a physical layer (PHY) unit; wherein the PHY unit is same in both the first mode and the second mode.

In another example embodiment, the PHY unit includes a radio transceiver architecture having at least one front end block; and the one front end block is used in both the first mode and the second mode.

In another example embodiment, further comprising a network interface device; wherein the memory is included in the network interface device.

In another example embodiment, the memory used in the network interface device is same in both the first mode and the second mode.

In another example embodiment, the memory is a baseband data stream buffer within the network interface device.

In another example embodiment, the wireless communication signals correspond to a first OFDM symbol defined by the first set of OFDM tones and a second OFDM symbol defined by the second set of OFDM tones.

In another example embodiment, the first OFDM symbol corresponds to a first physical (PHY) layer protocol, and the second OFDM symbol corresponds to a second physical (PHY) layer protocol.

In another example embodiment, the second set of OFDM tones include a greater number of tones than the first set of OFDM tones.

In another example embodiment, a number of tones in the second set of OFDM tones is at least four times greater than a number of tones in the first set of OFDM tones.

In another example embodiment, the first set of OFDM tones correspond to an IEEE 802.11ac standard protocol; and the second set of OFDM tones correspond to an IEEE 802.11ax standard protocol.

In another example embodiment, the OFDM channel bandwidth is at least one of: 20 MHz, 40 MHz, 80 MHz or 160 MHz.

In another example embodiment, the first mode is configured to transmit or receive wireless communication signals at a first data rate; and the second mode is configured to transmit or receive wireless communication signals at a second data rate.

In another example embodiment, the first data rate is faster than the second data rate.

In another example embodiment, the first data rate is four times faster than the second data rate.

In another example embodiment, the wireless communication signals are transmitted or received at a greater distance using the second data rate than when using the first data rate.

In another example embodiment, the first mode is configured to correspond to a first IEEE 802.11ac data rate; and the second mode is configured to correspond to a second IEEE 802.11ax data rate.

In another example embodiment, the wireless communications device is configured to simultaneously support both the first mode and the second mode using two different station identities.

In another example embodiment, the controller is configured to switch between the first mode and the second mode based on a received signal strength (RSS) of the wireless communications device.

In another example embodiment, the controller is configured to switch between the first mode and the second mode based on a supported mode of a second wireless communications device.

In another example embodiment, the controller is configured to switch between the first mode and the second mode based on channel noise or interference.

In another example embodiment, if the channel noise or interference is above a threshold level, the controller is configured to switch to a slower of the first and second modes.

In another example embodiment, if the channel noise or interference is below the threshold level, the controller is configured to switch to a faster of the first and second modes.

According to another example embodiment, a method for enabling an OFDM wireless communications device to be operated, comprising: distributing a set of instructions, stored on a non-transitory, tangible computer readable storage medium, for configuring the OFDM wireless communications device; wherein the instructions include: configuring a memory to support processing of OFDM tones; configuring a controller to set the wireless communication device to a first mode and a second mode; configuring the first mode to transmit or receive a first wireless communication signal having a first set of OFDM tones contained within an OFDM channel bandwidth; configuring the second mode to transmit or receive a second wireless communication signal having a second set of OFDM tones contained within the OFDM channel bandwidth; and processing the first set of OFDM tones in same size of the memory used for processing the second set of OFDM tones.

In another example embodiment, the OFDM channel bandwidth in the first mode and the second mode are different.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
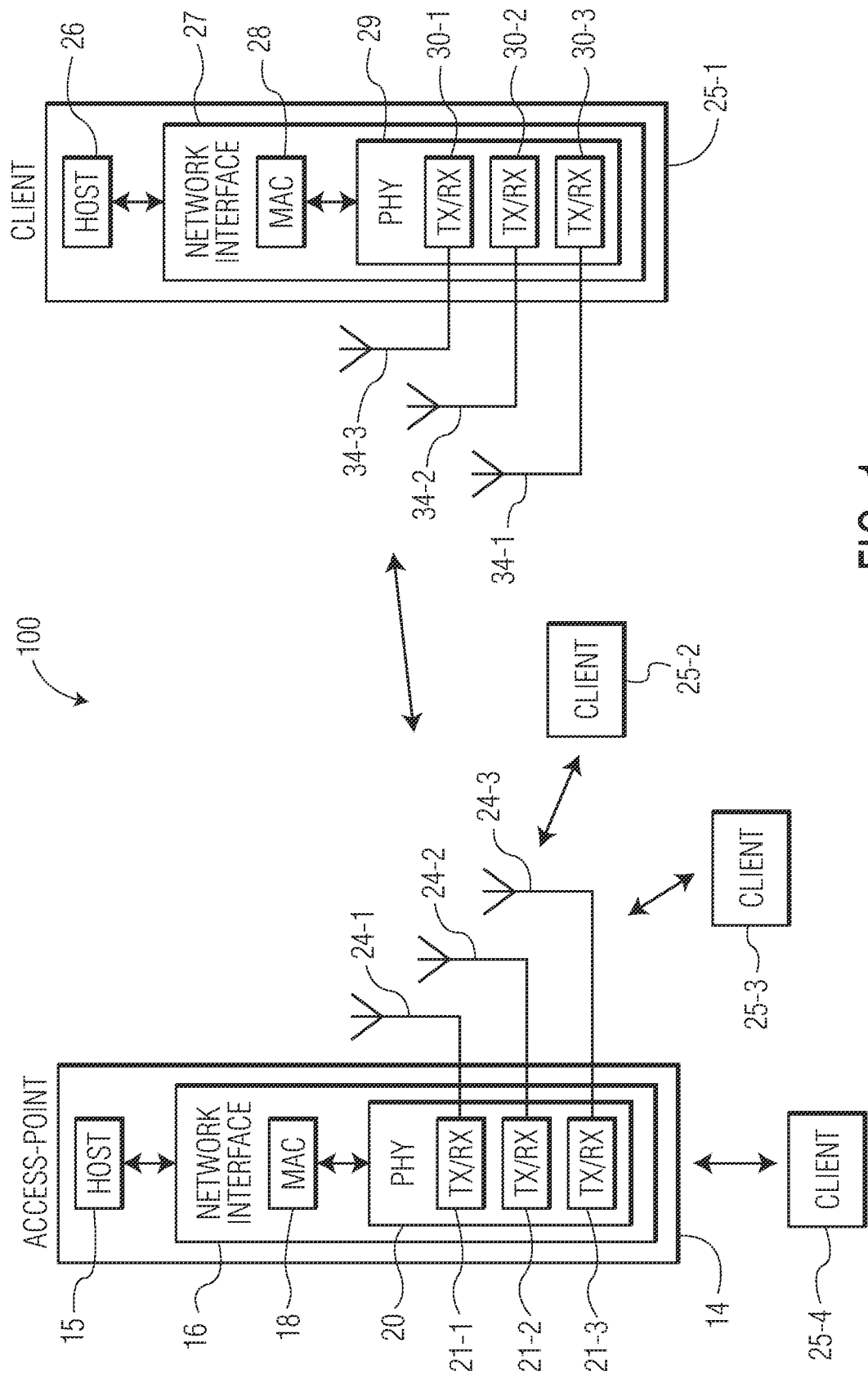
FIG. 1 represents an example wireless local area network (WLAN) including multiple wireless communications devices.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

OFDM Wireless (IEEE 802.11-WiFi) communications devices are designed to communicate in accordance with one or more standard protocols (e.g. 11ac, 11n, 11a, 11ax, etc.).

Each of these protocols may or may not have different communications channel bandwidth requirements and different communications packet attributes. For example, a WiFi6 (11ax) communications mode introduces a new OFDM numerology (4×) that packs 4 times a number of symbol subcarriers (i.e. tones) in a same channel bandwidth as WiFi5 communications modes (11ac, 11n, and 11a).

However, at either the Access-Point (AP) or Client, each OFDM symbol frame needs to be processed by the AP and Client's baseband blocks as a whole (i.e. using an entire frame or set of OFDM symbol tones). Note, the term "block" is herein to defined as a set of hardware and/or software configured to implement a functionality of the wireless device.

For the purposes of this discussion, example embodiments of wireless communications device adhere to the following definitions: a baseband signal is a signal whose frequency content is close to zero; baseband processing refers to processing of the baseband signal to extract the data carried in the signal; baseband hardware refers to digital logic hardware circuits for processing baseband signals; and baseband memory refers to memory used by the baseband hardware for baseband processing.

Thus while the 4× numerology improves spectral efficiency (bits/s/Hz) and throughput, every 11 ax OFDM symbol frame will take about 4 times longer for the baseband blocks of the AP to build/pack, and the Client to unpack, than would OFDM symbol frames for either the 11ac, 11n, or 11a protocols, for a given channel bandwidth. Note: the cyclic prefix and guard interval (GI) insertion times are excluded from this idealized example.

Given that the OFDM symbol frame takes about 4 times longer to encode during transmission and decode when received, the AP and Client baseband blocks will require a larger baseband memory for data-bit/PDU buffering. Thus an 11ax receiver device will thus need to buffer 4 times the number of frequency-domain samples corresponding to the 4× tones received within the channel bandwidth, and also buffer 4 times the number of time-domain samples (e.g. data-bits) corresponding to the AP's sampling rate.

As an example, a 20 MHz channel bandwidth 11ax device needs about 4 times the amount of baseband memory for buffering compared to a 20 MHz channel bandwidth 11ac device since flax has 4× the number of tones/subcarriers in the channel bandwidth as does 11ac.

Since the IEEE 802.11ax standard mandates backward compatibility for every supported channel bandwidth (e.g. an 11ax device that supports 20 MHz in 11ac will also need to support 20 MHz in 11ax), the larger memory required to support 11ax device results in a larger area/cost/power consumption.

Now discussed is are example design embodiments for wireless communications devices that switch between at least two different PHY (physical) layer protocols/modes having different communications channel bandwidth requirements and different communications packet attributes, but that for baseband processing still use a substantially similar size memory (e.g. memory buffer for data bit queuing).

In some example embodiments mode switching is primarily useful for Client applications; however, in other example embodiments mode switching can also be used for Access-point (AP) applications with operating mode change announcements.

FIG. 1 represents an example wireless local area network (WLAN) 100 including multiple wireless communications devices 14, 25-1, 25-2, 25-3, 25-4. In this example embodiment the wireless communications devices include an Access Point (AP) device 14 and four Client devices 25-1, 25-2, 25-3, 25-4.

The AP 14 exchanges (i.e. transmits and receives) wireless communication signals (e.g. data/bit streams) with one or more of the client stations 25-1, 25-2, 25-3, 25-4. The AP 14 is configured to communicate with one or more of the client stations 25-1, 25-2, 25-3, 25-4 according to one or more communication protocols (e.g. 802.11ac, 802.11ax, etc.). In some example embodiments, one or more client stations are configured to operate according only one of the communication protocols.

The AP 14 includes a host processor 15 coupled to a network interface device 16. The network interface 16 includes a medium access control (MAC) unit 18 and a physical layer (PHY) unit 20. The PHY unit 20 includes a plurality of transceivers 21, and the transceivers are coupled to a plurality of antennas 24. Although three transceivers 21 and three antennas 24 are shown, the AP 14 can include different numbers (e.g., 1, 2, 4, 5, etc.) of transceivers 21 and antennas 24 in other embodiments. In some example embodiments, the MAC unit 18 and the PHY unit 20 are configured to operate only according to a first communication protocol (e.g., the IEEE 802.11ac), while in other example embodiments, the MAC unit 18 and the PHY unit 20 are also configured to operate according to at least a second communication protocol (e.g., the IEEE 802.11ax).

The WLAN 100 includes a plurality of client stations 25. Although four client stations 25 are shown, the WLAN 100 can include different numbers (e.g., 1, 2, 3, 5, 6, etc.) of client stations 25 in various scenarios and embodiments. In some example embodiments, one or more of the client stations 25 are configured to operate only according to the first communication protocol while in other example embodiments, one or more of the client stations 25 are configured to operate according to at least both the first and second communication protocols.

While the discussion that follows may refer to only client device 25-1, that discussion would equally apply to the other client devices 25-2, 25-3, 25-4. The client station 25-1 includes a host processor 26 coupled to a network interface 27. The network interface device 27 includes a MAC unit 28 and a PHY unit 29. The PHY unit 29 includes a plurality of transceivers 30, and the transceivers 30 are coupled to a plurality of antennas 34. Although three transceivers 30 and three antennas 34 are shown, the client station 25-1 can include different numbers (e.g., 1, 2, 4, 5, etc.) of transceivers 30 and antennas 34 in other embodiments.

In various embodiments, the PHY unit 20 of the AP 14 is configured to generate data-units conforming either or both the first and second communication protocols. The transceiver(s) 21 is/are configured to transmit the generated data-units via the antenna(s) 24. Similarly, the transceiver(s) 24 is/are configured to receive the data-units via the antenna(s) 24. The PHY unit 20 of the AP 14 is configured to process received data-units conforming either or both the first and second communication protocols.

In various embodiments, the PHY unit 29 of the client device 25-1 is configured to generate data-units conforming either or both the first and second communication protocols. The transceiver(s) 30 is/are configured to transmit the generated data-units via the antenna(s) 34. Similarly, the transceiver(s) 30 is/are configured to receive data-units via the antenna(s) 34. The PHY unit 29 of the client device 25-1 is configured to process received data-units conforming either or both the first and second communication protocols.

Figure 2:
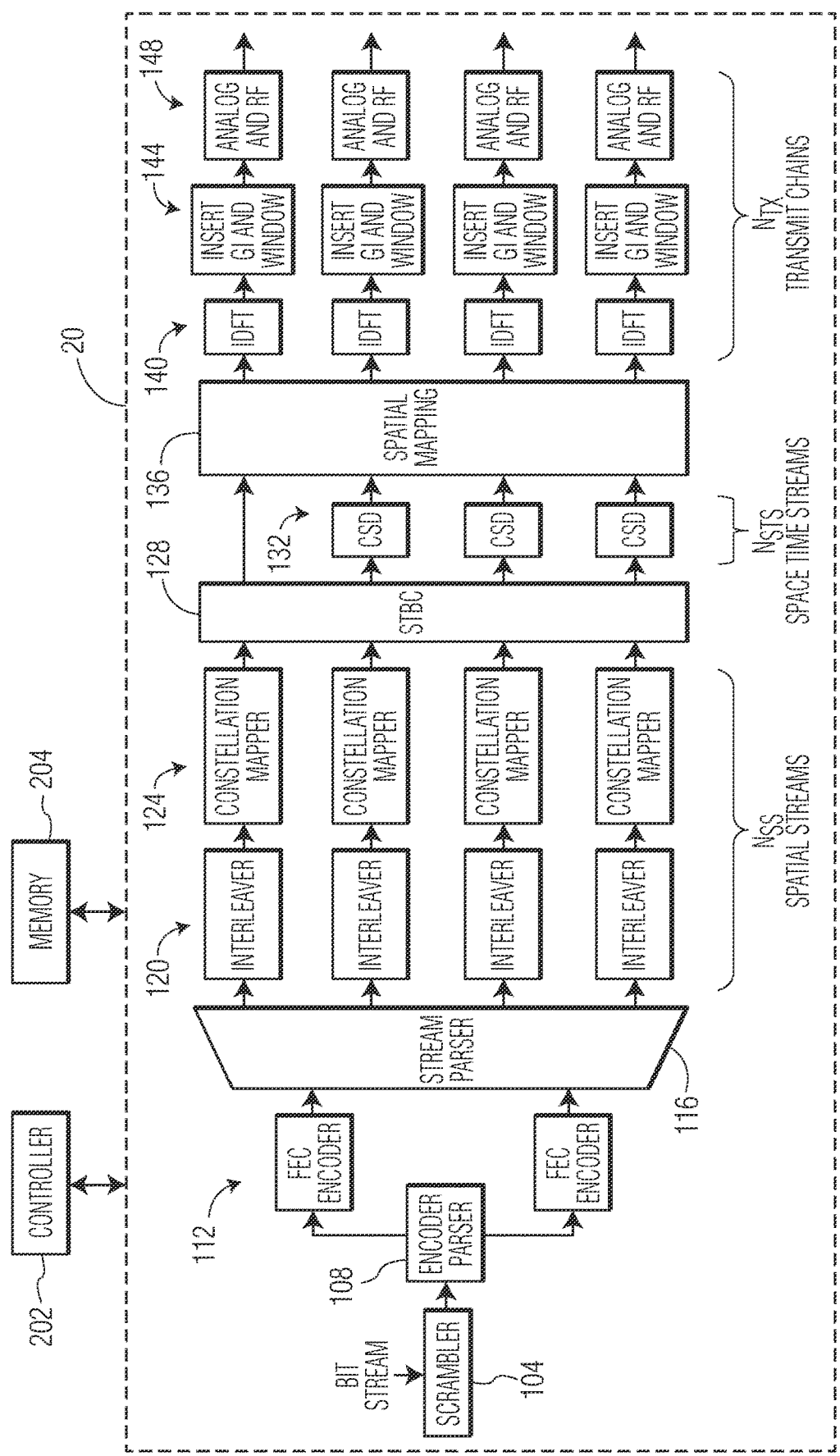
FIG. 2 represents an example physical layer (PHY) unit within one or more of the wireless communications devices.

FIG. 2 represents an example embodiment of the physical layer (PHY) unit 20, 29 within one or more of the wireless communications devices 14, 25-1, 25-2, 25-3, 25-4. While the PHY unit 20, 29 discussion that follows shows encoding of a bit-stream into a wireless communication signal (e.g. OFDM symbol) for transmission, those skilled in the art would understand similar PHY units for receiving and decoding the wireless communication signal (e.g. OFDM symbol) into the transmitted bit-stream.

In this example embodiment, the PHY unit 20, 29 is included in both the AP 14 and the client 25-1. The PHY unit 20, 29 includes a scrambler 104 that generally scrambles an information/data bit stream to reduce the occurrence of long sequences of ones or zeros and to generate a scrambled stream. An encoder parser 108 demultiplexes the scrambled stream into one or two encoder input streams corresponding to one or two forward error correction (FEC) encoders 112. Each encoder 112 encodes the corresponding input stream to generate a corresponding encoded stream.

A stream parser 116 parses the one or two encoded streams into up to four spatial streams. Corresponding to each spatial stream, an interleaver 120 interleaves bits of the spatial stream (i.e., changes the order of the bits) to prevent long sequences of adjacent noisy bits from entering a decoder at the receiver. Also corresponding to each spatial stream, a constellation mapper 124 maps an interleaved sequence of bits to constellation points corresponding to different subcarriers (e.g. tones) of an orthogonal frequency division multiplexing (OFDM) symbol.

A space-time block coding unit 128 receives the constellation points corresponding to the one or more spatial streams and spreads the spatial streams to a greater number of space-time streams. The space-time block coding unit 128 can be controlled to merely pass through spatial streams without performing space-time block coding. For example, when the number of spatial streams is four, the space-time block coding unit 128 does not perform space-time block coding.

A plurality of cyclic shift diversity (CSD) units 132 insert cyclic shifts into all but one of the space-time streams (if more than one space-time stream). The cyclic shifts are to prevent unintentional beamforming.

A spatial mapping unit 136 maps the space-time streams to transmit chains. Spatial mapping may include: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

Each output of the spatial mapping unit 136 corresponds to a transmit chain, and each output of the spatial mapping unit 136 is operated on by an inverse discrete Fourier transform (IDFT) unit 140 that converts a block of constellation points to a time-domain signal.

Outputs of the IDFT units 140 are provided to guard interval (GI) insertion and windowing units 144 that prepends, to an OFDM symbol, a circular extension of the OFDM symbol and smooths the edges of each symbol to increase spectral decay. Outputs of the GI insertion and windowing units 144 are provided to analog and radio frequency (RF) units that convert the signals to analog signals and upconvert the signals to RF frequencies for transmission.

Figure 3:
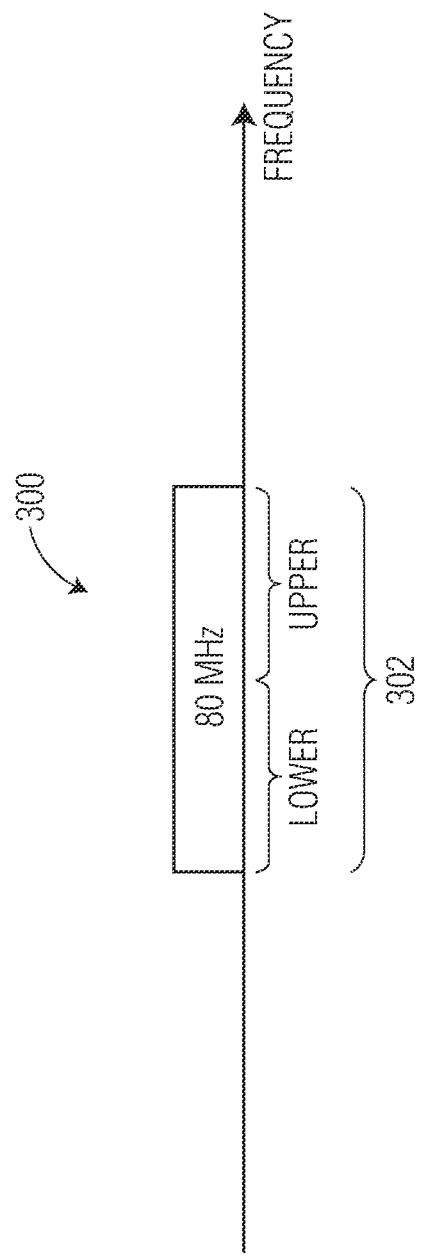
FIG. 3 represents an example wireless communication channel and bandwidth.

FIG. 3 represents an example wireless communication channel 300 and bandwidth 302. While a contiguous 80 MHz channel bandwidth 302 is shown, in other example embodiments the PHY unit 20, 29 can be configured to communicate using either 20 MHz, 40 MHz, 80 MHz, 120 MHz, and 160 MHz channel bandwidths depending upon the wireless communications protocol being used.

In some example embodiments, the channel 300 is transmitted using a single radio transceiver architecture.

In other example embodiments, the channel 270 is transmitted using a dual radio transceiver architecture having two separate front end blocks. For example, a first radio transceiver transmits a lower portion of the channel 270, and a second radio transceiver transmits an upper portion of the channel 270.

In some example embodiments, the dual radio transceiver architecture uses separate IDFT blocks 240, separate GI insertion and windowing units, and separate analog and RF units to generate the lower and upper portions, whereas scrambling, encoding, interleaving, constellation mapping, etc., operate over the entire 80 MHz channel. While in other example embodiments, separate scrambling units, separate encoders, separate interleaving units, separate constellation mapping units, etc, and separate IDFT blocks, separate GI insertion and windowing units, and separate analog and RF units generate the lower and upper portions.

Figure 4:
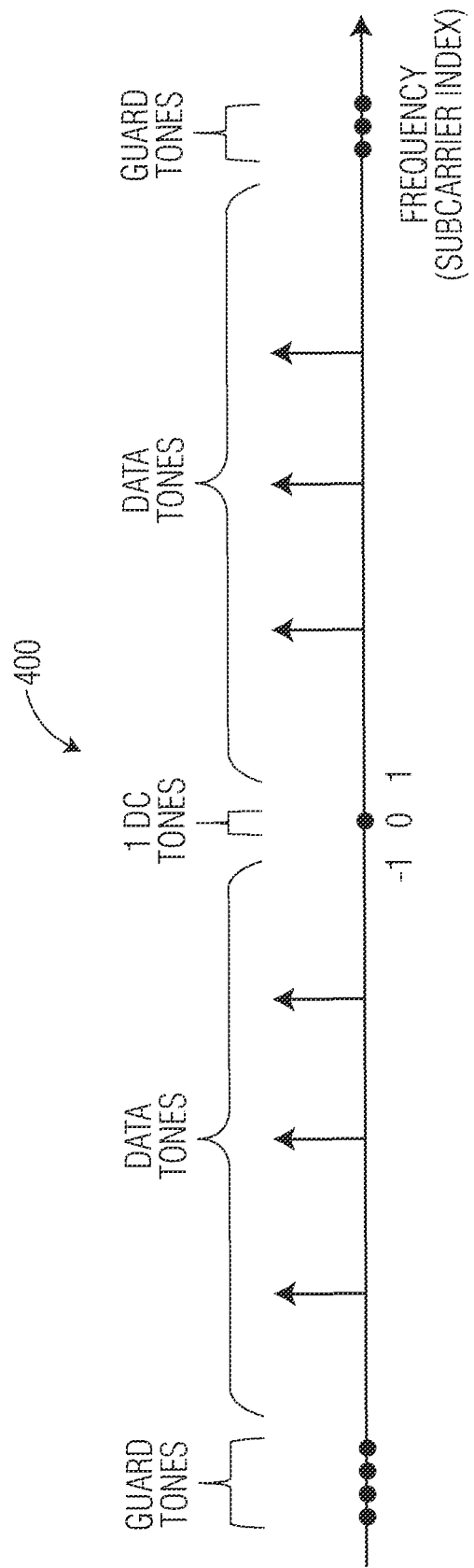
FIG. 4 represents an example OFDM symbol generated according to a first communication protocol (e.g. 802.11ac) for transmission within a communication channel.

FIG. 4 represents an example OFDM symbol 400 generated according to the first communication protocol (e.g. 802.11ac) for transmission within a communication channel having a predetermined bandwidth (e.g. 20 MHz).

The OFDM symbol 400 shows a set of tones/subcarriers within the communications channel. Representative tones include guard tones, a direct current (DC) tone, data tones, and pilot tones. The guard tones are provided for filter ramp up and ramp down. The index-0 tone is the DC tone, which is provided for mitigating radio frequency interference.

As shown, there are a total of 6 data tones in this hypothetical example. Note, these tones are presented for written description purposes and an actual 802.11ac could have a greater number of tones.

Figure 5:
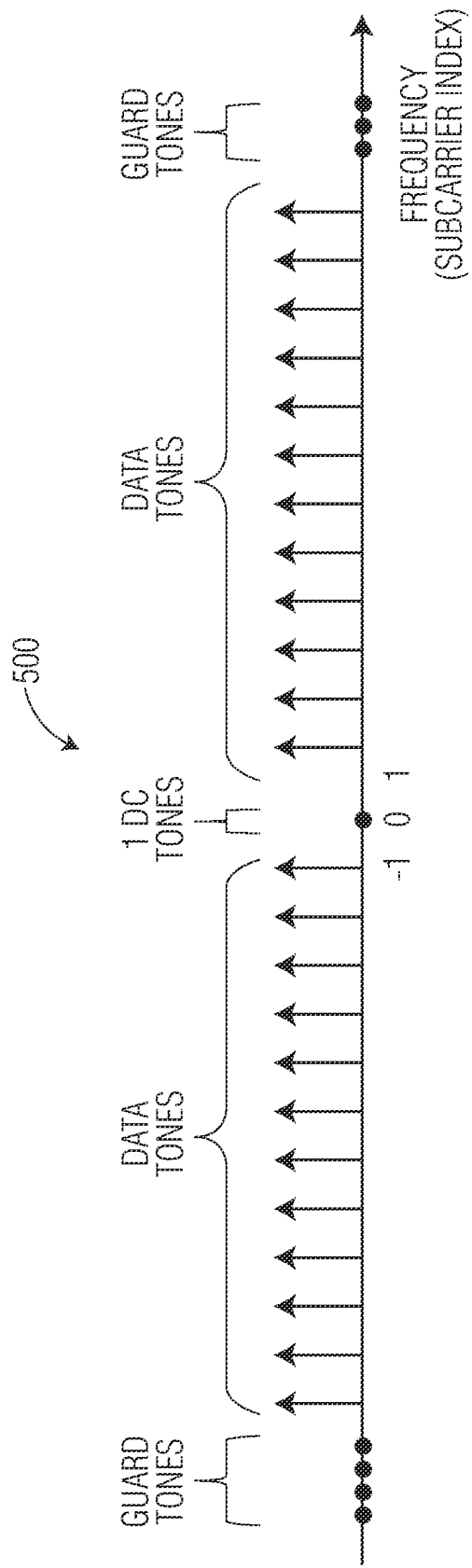
FIG. 5 represents an example OFDM symbol generated according to a second communication protocol (e.g. 802.11ax) for transmission within the communication channel.

FIG. 5 represents an example OFDM symbol generated according to the second communication protocol (e.g. 802.11ax) for transmission within the communication channel having the same predetermined bandwidth (e.g. 20 MHz) as shown in FIG. 4.

The OFDM symbol 500 shows a set of tones/subcarriers within the communications channel. As before, representative tones include guard tones, a direct current (DC) tone, data tones, and pilot tones. The guard tones are provided for filter ramp up and ramp down. The index-0 tone is the DC tone, which is provided for mitigating radio frequency interference.

As shown, there are a total of 24 (4×) data tones in this hypothetical example. Note, these tones are presented for written description purposes and an actual 802.11ax could have a greater number of tones.

As mentioned earlier, the WiFi6 (flax) communications mode introduces a new OFDM numerology that packs 4 times (4×) a number of symbol subcarriers (i.e. tones) in a same channel bandwidth as WiFi5 communications modes (11ac, 11n, and 11a).

Now discussed are example operational embodiments of the wireless communications devices 14, 25-1, 25-2, 25-3, 25-4 that switch between at least two different PHY (physical) layer protocols/modes having different communications channel bandwidth requirements and different communications packet attributes, but that for baseband processing still use a substantially similar size memory (e.g. memory buffer for data bit queuing).

Figure 6:
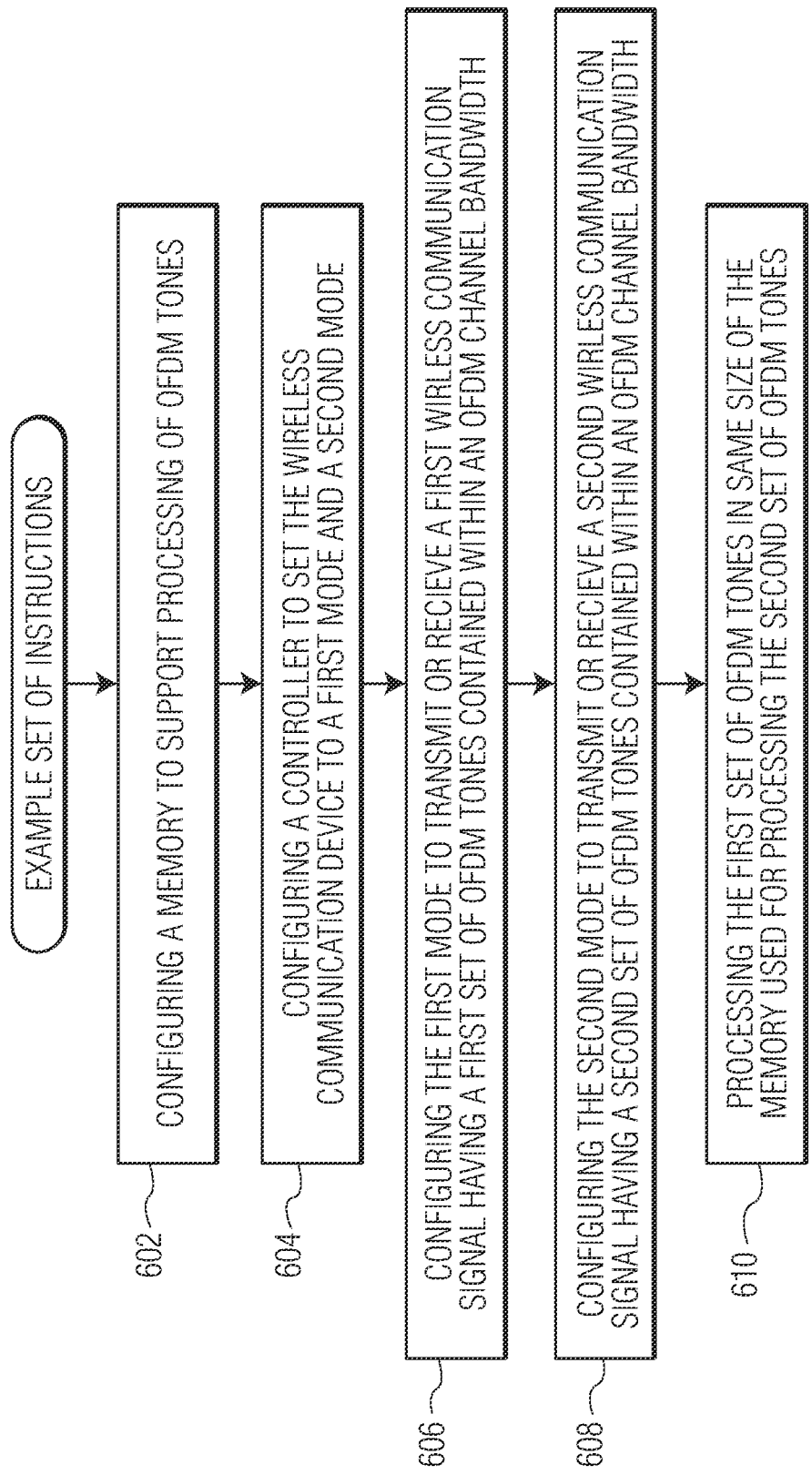
FIG. 6 is an example set of instructions for enabling the wireless communications device.

FIG. 6 is an example set of instructions for enabling the wireless communications device 14, 25-1, 25-2, 25-3, 25-4. The order in which the instructions are discussed does not limit the order in which other example embodiments implement the instructions unless otherwise specifically stated. Additionally, in some embodiments the instructions are implemented concurrently.

A first example instruction set begins in 602, by configuring a memory 204 to support processing of OFDM tones. In 604, configuring a controller 202 to set the wireless communication device to a first mode and a second mode. In 606, configuring the first mode to transmit or receive a first wireless communication signal having a first set of OFDM tones contained within an OFDM channel bandwidth. In 608, configuring the second mode to transmit or receive a second wireless communication signal having a second set of OFDM tones contained within the OFDM channel bandwidth. In 610, processing the first set of OFDM tones in same size of the memory used for processing the second set of OFDM tones.

The above instructions can be augmented or replaced with one or more of the additional instructions derived from the following.

In some example embodiments, the switching between the two modes is triggered by either an internal decision made by firmware, or a host command. Switching can happen during boot, runtime, or during a soft-reset.

In some example embodiments, at least one of the wireless communications devices 14, 25-1, 25-2, 25-3, 25-4 switches between: a Mode 1: 20 MHz flax (and 20 MHz 11ac/n/b/g for backwards compatibility), and a Mode 2: 80 Mz 11ac (and 80/40/20 MHz 11ac/n/a/g for backwards compatibility)

The first and second modes, in some example embodiments, are chosen so that corresponding baseband memory requirements are matching (e.g. 20 MHz flax (with 4× numerology) needs about a same amount of buffering as 80 MHz 11ac (with 1× numerology)).

Switching between these modes has at least the following advantages in some example embodiments:

Enables the device to exist either in 80 MHz 11ac OR 20 MHz 11ax modes without violating the 11ax/ac standards.

Memory required for baseband processing (e.g. memory used by the baseband hardware for baseband processing) is minimal for the two modes due to a unified flow control and data processing Enables the client device to switch between these two modes depending on actual operating conditions (RSSI, regulatory restrictions, AP support, etc)

Allows for further memory/area/cost savings if low density parity check (LDPC) encoding is not supported.

Enables switching between a high throughput mode (e.g. closer communications range but higher 11ac 80 MHz bandwidth/data rate) and a high range mode (e.g. further range but lower 11ax 20 MHz bandwidth/data rate)

In some example embodiments, to indicate the switching decision to the AP 14, a client device first dis-associates with the AP 14, second switches mode and then third re-associates with AP 14 to announce its new capabilities through the corresponding VHT/HE PHY/MAC capability fields. Note: VHT corresponds to Very High throughput (e.g. 11ac) and HE corresponds to High Efficiency (e.g. 11ax). In other example embodiments, mode switching are made without association or reassociation.

Switching decisions can be made during idle time, for example during TWT or IEEE power save idling. A client device could also choose to announce different VHT and HE capabilities, which allows simultaneous 20 MHz 11ax and 80 MHz 11ac operation. Tx and Rx capabilities can be independently handled/announced.

The wireless communications device 14, 25-1, 25-2, 25-3, 25-4 switch between modes using a combination of both analog RF blocks and baseband processing blocks, in conjunction with any necessary bookkeeping on the MAC/SOC/SW blocks. In some example embodiments, individual blocks/IPs can be retained in both modes to reduce switching time. For example: Analog/RF and baseband can remain in 80 MHz mode (allowing wider bandwidth) while upper layers (MAC/SOC/SW) announce and process in 20 MHz mode.

In some example embodiments, baseband processing within the network interface device 16 is very similar for either the 802.11ac or 802.11ax modes. In such example embodiments, a majority of the baseband hardware (e.g. digital logic hardware circuits for processing baseband signals) can also be reused between the two modes, enabling a choice between these two modes to be memory optimal and control/processing logic optimized.

The wireless communications devices 14, 25-1, 25-2, 25-3, 25-4 in other example embodiments can operate in a "dual" mode where at least one of the wireless devices simultaneously supports both 20 MHz 11ax and 80 MHz 11ac by posing as two separate STAs (virtual STA) with different STA IDs. The device's transmitter baseband and RF configuration depends on the bandwidth/type of packet transmitted. Some arbitration (i.e. how communications priority between simultaneously transmitting radios is decided) may be needed to decide on transmission priorities between the two virtual STAs. A device's receiver can operate in the wider (80 MHz) bandwidth mode (RF & baseband time domain) and select the sub-bandwidth needed based on the detected packet type on the primary channel. Processing/Sampling can be adjusted, if required, on the second STF in the packet (11n/ac/ax only)

The controller 202 in some example embodiments can be configured to switch between various modes based on factors such as:

Received signal strength (RSS). For example, client devices closer to the AP can switch to Mode 2 (11ac 80 MHz) for a higher throughput, while client devices farther from the AP can switch to Mode 1 (11ax 20 MHz) for higher throughput at range.

AP 14 support. For example, client devices connected to an 11ac AP could switch to the supported 11ac mode, while client devices connected to a 11ax AP can choose between either the 11ac or 11ax modes.

Interference and/or Environmental conditions. For example, AP or client devices experiencing a higher interference/noise level can switch to 11ax 20 MHz for slower but more robust communication. However, if interference/noise levels are acceptable the AP or client devices can switch to 11ac 80 MHz for faster/higher throughput communication.

Regulatory transmit power and/or bandwidth restrictions.

AP device 14 or client device power consumption variations for each of the modes.

Mode switching can also be dynamic, periodically reassessing whether to mode switch while still remaining in one mode. Dynamic mode reassessment in some example embodiments is useful for mobile client devices, or in scenarios where interference/channel conditions are changing.

Figure 7:
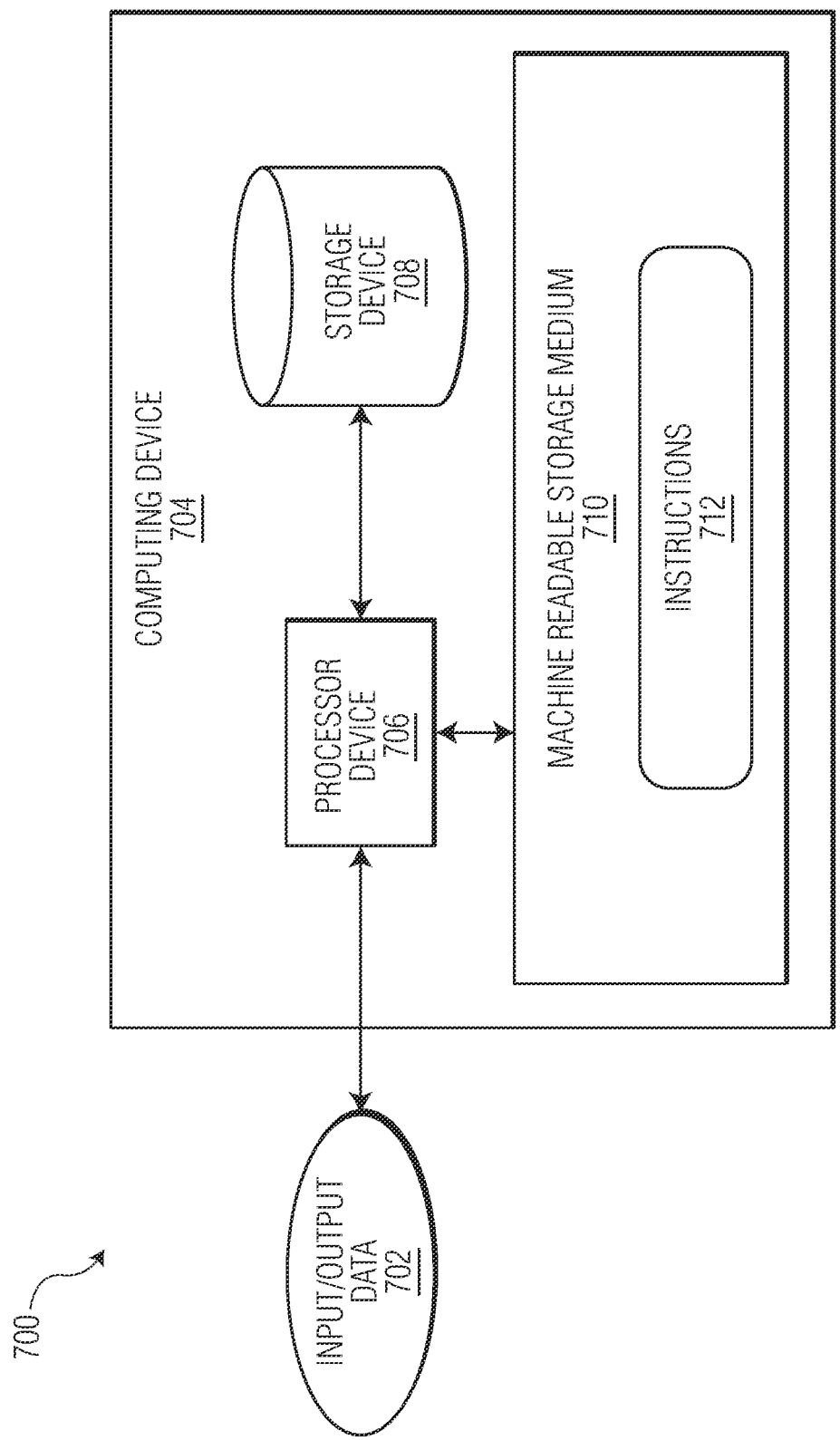
FIG. 7 is an example system for hosting instructions for enabling the wireless communications device.

FIG. 7 is an example system 700 for hosting instructions for enabling the wireless communications device 14, 25-1, 25-2, 25-3, 25-4. The system 700 shows an input/output data 702 interface with an electronic apparatus 704. The electronic apparatus 704 includes a processor 706, a storage device 708, and a non-transitory machine-readable storage medium 710. The machine-readable storage medium 710 includes instructions 712 which control how the processor 706 receives input data 702 and transforms the input data into output data 702, using data within the storage device 708. Example instructions 712 stored in the machine-readable storage medium 710 are discussed elsewhere in this specification. The machine-readable storage medium in an alternate example embodiment is a non-transitory computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transitory machine-readable storage medium using a bus and performs operations and tasks that implement one or more instructions stored in the machine-readable storage medium. The machine-readable storage medium in an alternate example embodiment is a computer-readable storage medium.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions described above are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

The term file or a set of files refers to any collection of files, such as a directory of files. A file can refer to any data object (e.g., a document, a bitmap, an image, an audio clip, a video clip, software source code, software executable code, etc.). A file can also refer to a directory (a structure that contains other files).

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. An OFDM wireless communications device, comprising:
   a memory configured to support processing of OFDM tones;
   a controller, coupled to the memory, and configured to set the wireless communication device to a first mode and a second mode;
   wherein the first mode is configured to transmit or receive a first wireless communication signal having a first set of OFDM tones contained within an OFDM channel bandwidth;
   wherein the second mode is configured to transmit or receive a second wireless communication signal having a second set of OFDM tones contained within the OFDM channel bandwidth; and
   wherein the memory used for processing the first set of OFDM tones is same as the memory used for processing the second set of OFDM tones.

2. The device of claim 1:
   wherein the OFDM channel bandwidth is same in both the first mode and the second mode.

3. The device of claim 1:
   further comprising a physical layer (PHY) unit;
   wherein the PHY unit is same in both the first mode and the second mode.

4. The device of claim 3:
   wherein the PHY unit includes a radio transceiver architecture having at least one front end block; and
   wherein the one front end block is used in both the first mode and the second mode.

5. The device of claim 1:
   further comprising a network interface device;
   wherein the memory is included in the network interface device.

6. The device of claim 5:
   wherein the memory used in the network interface device is same in both the first mode and the second mode.

7. The device of claim 5:
   wherein the memory is a baseband data stream buffer within the network interface device.

8. The device of claim 1:
   wherein the wireless communication signals correspond to a first OFDM symbol defined by the first set of OFDM tones and a second OFDM symbol defined by the second set of OFDM tones.

9. The device of claim 1:
   wherein the first OFDM symbol corresponds to a first physical (PHY) layer protocol, and the second OFDM symbol corresponds to a second physical (PHY) layer protocol.

10. The device of claim 1:
    wherein the second set of OFDM tones include a greater number of tones than the first set of OFDM tones.

11. The device of claim 1:
    wherein a number of tones in the second set of OFDM tones is at least four times greater than a number of tones in the first set of OFDM tones.

12. The device of claim 1:
    wherein the first set of OFDM tones correspond to an IEEE 802.11ac standard protocol; and
    wherein the second set of OFDM tones correspond to an IEEE 802.11ax standard protocol.

13. The device of claim 1:
    wherein the OFDM channel bandwidth is at least one of: 20 MHz, 40 MHz, 80 MHz or 160 MHz.

14. The device of claim 1:
    wherein the first mode is configured to transmit or receive wireless communication signals at a first data rate; and
    wherein the second mode is configured to transmit or receive wireless communication signals at a second data rate.

15. The device of claim 14:
    wherein the first data rate is faster than the second data rate.

16. The device of claim 14:
    wherein the first data rate is four times faster than the second data rate.

17. The device of claim 14:
    wherein the wireless communication signals are transmitted or received at a greater distance using the second data rate than when using the first data rate.

18. The device of claim 1:
    wherein the first mode is configured to correspond to a first IEEE 802.11ac data rate; and
    wherein the second mode is configured to correspond to a second IEEE 802.11ax data rate.

19. The device of claim 1:
    wherein the wireless communications device is configured to simultaneously support both the first mode and the second mode using two different station identities.

20. The device of claim 1:
    wherein the controller is configured to switch between the first mode and the second mode based on a received signal strength (RSS) of the wireless communications device.

21. The device of claim 1:
    wherein the controller is configured to switch between the first mode and the second mode based on a supported mode of a second wireless communications device.

22. The device of claim 1:
wherein the controller is configured to switch between the first mode and the second mode based on channel noise or interference.

23. The device of claim 22:
wherein if the channel noise or interference is above a threshold level, the controller is configured to switch to a slower of the first and second modes.

24. The device of claim 23:
wherein if the channel noise or interference is below the threshold level, the controller is configured to switch to a faster of the first and second modes.

25. The device of claim 1:
wherein the OFDM channel bandwidth in the first mode and the second mode are different.

26. An OFDM wireless communications device, comprising:
a memory configured to support processing of OFDM tones;
a controller, coupled to the memory, and configured to set the wireless communication device to a first mode and a second mode;
wherein the first mode is configured to transmit or receive a first wireless communication signal having a first set of OFDM tones contained within an OFDM channel bandwidth;
wherein the second mode is configured to transmit or receive a second wireless communication signal having a second set of OFDM tones contained within the OFDM channel bandwidth;
wherein the memory used for processing the first set of OFDM tones is same as the memory used for processing the second set of OFDM tones; and
wherein the second set of OFDM tones include a greater number of tones than the first set of OFDM tones.

27. An OFDM wireless communications device, comprising:
a memory configured to support processing of OFDM tones;
a controller, coupled to the memory, and configured to set the wireless communication device to a first mode and a second mode;
wherein the first mode is configured to transmit or receive a first wireless communication signal having a first set of OFDM tones contained within an OFDM channel bandwidth;
wherein the second mode is configured to transmit or receive a second wireless communication signal having a second set of OFDM tones contained within the OFDM channel bandwidth;
wherein the memory used for processing the first set of OFDM tones is same as the memory used for processing the second set of OFDM tones; and
wherein the wireless communications device is configured to simultaneously support both the first mode and the second mode using two different station identities.

28. An OFDM wireless communications device, comprising:
a memory configured to support processing of OFDM tones;
a controller, coupled to the memory, and configured to set the wireless communication device to a first mode and a second mode;
wherein the first mode is configured to transmit or receive a first wireless communication signal having a first set of OFDM tones contained within an OFDM channel bandwidth;
wherein the second mode is configured to transmit or receive a second wireless communication signal having a second set of OFDM tones contained within the OFDM channel bandwidth;
wherein the memory used for processing the first set of OFDM tones is same as the memory used for processing the second set of OFDM tones; and
wherein the controller is configured to switch between the first mode and the second mode based on a supported mode of a second wireless communications device.

29. An OFDM wireless communications device, comprising:
a memory configured to support processing of OFDM tones;
a controller, coupled to the memory, and configured to set the wireless communication device to a first mode and a second mode;
wherein the first mode is configured to transmit or receive a first wireless communication signal having a first set of OFDM tones contained within an OFDM channel bandwidth;
wherein the second mode is configured to transmit or receive a second wireless communication signal having a second set of OFDM tones contained within the OFDM channel bandwidth; and
wherein the memory used for processing the first set of OFDM tones is same as the memory used for processing the second set of OFDM tones; and
wherein the controller is configured to switch between the first mode and the second mode based on channel noise or interference.

* * * * *